United States Patent
Fujimoto et al.

(10) Patent No.: US 7,033,233 B2
(45) Date of Patent: Apr. 25, 2006

(54) WELDING TERMINAL AND WELDING APPARATUS FOR WELDING THE SAME

(75) Inventors: Kei Fujimoto, Haibara-gun (JP); Tadahisa Sakaguchi, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 15 days.

(21) Appl. No.: 10/422,938

(22) Filed: Apr. 25, 2003

(65) Prior Publication Data

US 2003/0226823 A1 Dec. 11, 2003

(30) Foreign Application Priority Data

May 20, 2002 (JP) ............................. P2002-144706

(51) Int. Cl.
*H01R 4/02* (2006.01)
(52) U.S. Cl. ..................................................... 439/874
(58) Field of Classification Search ................ 439/874, 439/875, 656; 174/84 C, 75 C; 29/877, 29/863, 878, 860
See application file for complete search history.

(56) References Cited

U.S. PATENT DOCUMENTS

| 2,664,844 | A | * | 1/1954 | Siegrist et al. | ............... | 439/874 |
| 3,852,517 | A | * | 12/1974 | Fava | ........................... | 439/875 |
| 4,966,565 | A | * | 10/1990 | Dohi | ........................... | 439/874 |
| 6,135,829 | A | * | 10/2000 | Johnston | ..................... | 439/874 |

FOREIGN PATENT DOCUMENTS

JP 62-140308 A 6/1987

* cited by examiner

*Primary Examiner*—Tho D. Ta
(74) *Attorney, Agent, or Firm*—Sughrue Mion, PLLC

(57) ABSTRACT

A welding terminal for electrically connecting a conductor portion of a wire includes a terminal base plate portion, on which the conductor portion is placed for welding and a pair of side walls, formed on opposite side edges of the terminal base plate portion so as to stand perpendicularly. The wire has a plurality of conductors covered with a insulating sheath. Each corner portion formed by the each side wall and terminal base plate portion has a rounded shape in cross section.

1 Claim, 4 Drawing Sheets

WELDING TERMINAL AND WELDING APPARATUS FOR WELDING THE SAME

BACKGROUND OF THE INVENTION

This invention relates to a welding terminal and a welding apparatus for welding the welding terminal, and more particularly to such welding terminal and welding apparatus, in which for example, an insulating sheath of a wire is removed to thereby expose a conductor portion thereof, and this exposed conductor portion is welded to a terminal base plate portion by welding or vibration welding.

A related method of connecting a welding terminal and a wire together is disclosed in JP-A-62-140308, in which a conductor portion of a wire is welded to a central portion of a welding portion of a terminal base plate by electric resistance welding, ultrasonic welding or the like, thereby enhancing the reliability of the electrical connection.

For example, as shown in FIG. 6, a welding terminal 100 of an integral construction, formed by bending an electrically-conductive sheet, includes a terminal base plate portion 101 which has an earth fastening hole 103 (serving as an electrical connection portion), formed in a front end portion thereof, and also has a pair of wire sheath-clamping portions 105 formed at a rear end portion thereof. Further, a pair of side walls 102 are formed on and project perpendicularly from opposite side edges of an intermediate portion of the terminal base plate portion 101 (serving as a welding portion), respectively, so that this portion is cross-sectionally U-shaped.

A conductor portion 108 of a wire 106, exposed by removing an insulating sheath 107 thereof, is set between the side walls 102 of the terminal base plate portion 101 serving as the welding portion.

In this condition, a vibration horn 110 is pressed against the conductor portion 108 from the upper side as shown in FIG. 7A, and this vibration horn 110 applies ultrasonic vibration to the conductor portion 108.

As a result, the cross-section of the conductor portion 108 is deformed from a circular shape into a flattened shape as shown in FIG. 7B, and at the same time, conductors of the conductor portion 108 are fused by localized vibration heat produced by the ultrasonic vibration energy.

At this time, the side walls 102 serve to prevent the conductors of the conductor portion 108, pressed by the vibration horn 110, from being loosened, thereby preventing the ultrasonic vibration energy from being less liable to be transmitted thereto. As a result, the conductor portion 108 of the wire 106 is integrally fused and fixed to the terminal base plate portion 101 of the welding terminal 100 as shown in FIG. 7C.

Therefore, the related welding terminal 100 can achieve a higher reliability of the electrical connection as compared with a press-clamping terminal in which a conductor portion of a wire is press-clamped by conductor-clamping portions formed integrally on a terminal base plate portion.

The method of welding the conductor portion 108 of the wire 106 to the terminal base plate portion 101 of the welding terminal 100 is not limited to the ultrasonic welding method, employing the vibration horn 110, but there can be used any other suitable method such as an electric resistance welding method in which the conductor portion 108 is welded and fixed to the terminal base plate portion by the use of a welding electrode.

However, as shown in FIG. 7, the pair of side walls 102, formed perpendicularly on the terminal base plate portion 101 of the welding terminal 100, are formed by bending the relevant portions at substantially right angles. Therefore, when the conductor portion 108 is pressed by the vibration horn 110 for welding the conductor portion 108 to the terminal base plate portion 101, it is difficult to press the conductor portion 108 closely into corner portions 104 formed respectively at the opposite side edges of the terminal base plate portion 101.

The vibration horn 110 fails to press the conductor portion 108 closely into the opposite side corner portions 104, so that gaps 111 are formed between each opposite side corner portion 104 and the conductor portion 108 as shown in FIG. 7C.

As a result, the ultrasonic vibration energy is less liable to be transmitted to the conductor portion 108. Even when the welding is effected in such a condition, those portions of the conductor portion 108, facing the corner portions 104, respectively, are insufficiently welded, and this has invited a problem that the strength of the joined portions decreases.

In addition, when the gap 111 is formed at the welded portion, the formation of an interfacial corrosive product is promoted at the gap 111, which leads to a possibility that the electrical connection performance is lowered. Particularly when an aluminum alloy is used as the electrically-conductor sheet for forming the welding terminal 100, the formation of such corrosive product is often arisen.

SUMMARY OF THE INVENTION

It is therefore an object of the present invention to provide a welding terminal, as well as a welding apparatus for welding the same, in which when welding a conductor portion of a wire to a terminal base plate portion, the strength of a welded portion can be increased, and also an electrical connection performance is prevented from being lowered.

In order to achieve the above object, according to the present invention, there is provided a welding terminal for electrically connecting a conductor portion of a wire which has a plurality of conductors covered with a insulating sheath, comprising:

a terminal base plate portion, on which the conductor portion is placed for welding; and a pair of side walls, formed on opposite side edges of the terminal base plate portion so as to stand perpendicularly, wherein each corner portion formed by the each side wall and terminal base plate portion has a rounded shape in cross section.

In the above configuration, the plurality of conductors, pressed during the welding operation, can be expanded to the corner portions, with no gap formed therebetween, and therefore can be uniformly pressed thereto.

Therefore, the pressing force, developing during the welding operation, is uniformly transmitted to the plurality of conductors, so that the positive welding can be effected, and therefore the strength of the joined portions increases.

And besides, the plurality of conductors are expanded to the corner portions with no gap formed therebetween, and are welded thereto, and therefore the formation of an interfacial corrosive product can be suppressed.

Preferably, a radius of the corner portion is ⅓ to 1 times a radius of the conductor portion of the wire.

According to the present invention, there is also provided a welding apparatus for welding a conductor portion of a wire which has a plurality of conductors covered with a insulating sheath to a welding terminal having a pair of side walls formed on opposite side edges thereof so as to stand perpendicularly, comprising:

a pressing member, which press the conductor portion placed between the side walls against the welding terminal for welding, wherein a pressing face of the pressing member has a convex shape.

Preferably, the pressing face is curved in a arrangement direction of the side walls.

In the above configuration, during the welding operation, the pressing face shaped into the convex of the pressing member, uniformly presses the plurality of conductors to expand these conductors in the arrangement direction of the side walls. Namely, the plurality of conductors can be pressed not only toward the terminal base plate portion but also toward the opposite side walls so as to be compressed.

Therefore, the plurality of conductors thus pressed can be satisfactorily expanded to the corner portions with no gap formed therebetween, and the pressing force, applied during the welding operation, can be uniformly transmitted to the plurality of conductors, and the welding can be effected efficiently, and besides the strength of the joined portions increases.

Furthermore, the plurality of conductors are expanded to the corner portions with no gap formed between, and are welded thereto, and therefore the formation of an interfacial corrosive product can be suppressed.

A vibration horn as used in the ultrasonic welding, or an electrode as used in the electric resistance welding, can be used as the pressing member.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Preferred embodiments of a welding terminal of the present invention, as well as a welding apparatus for welding the welding terminal, will now be described in detail with reference to the accompanying drawings.

Figure 1:
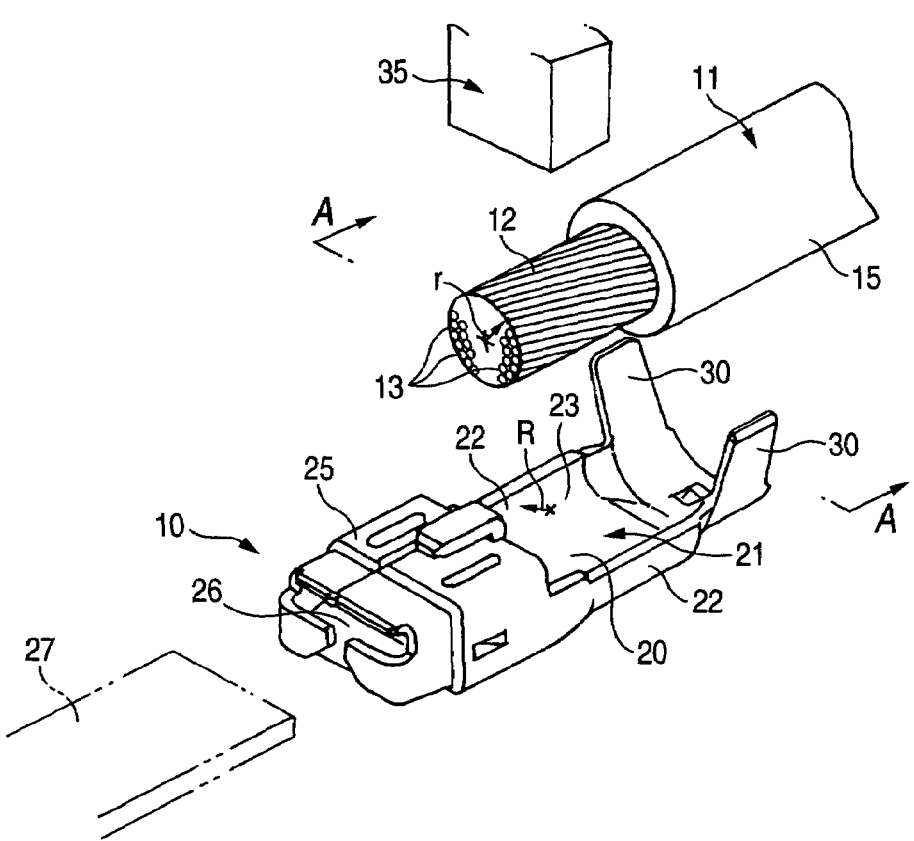
FIG. 1 is a perspective view showing an overall construction of a welding terminal according to a first embodiment of the present invention.
Figure 2:
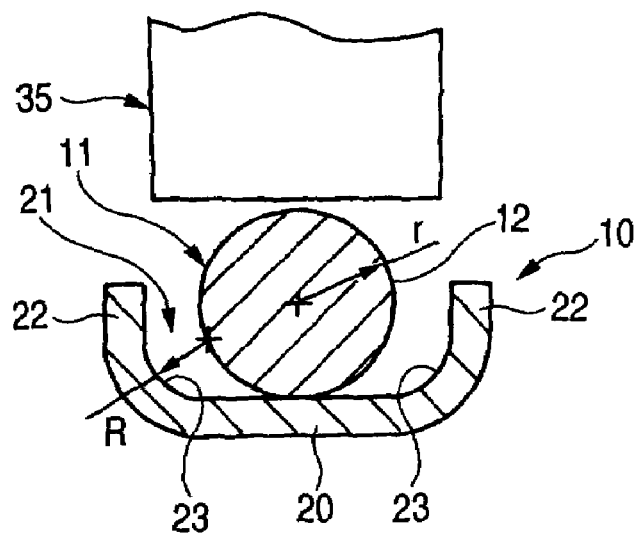
FIG. 2 is a cross-sectional view of the welding terminal of FIG. 1 taken along the line A—A of FIG. 1.
Figure 3:
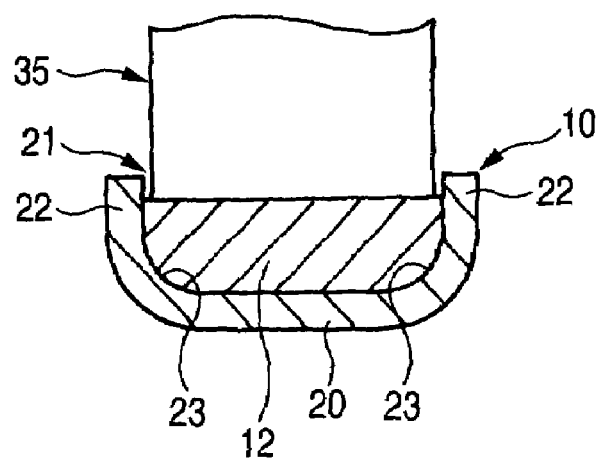
FIG. 3 is a cross-sectional view showing a welded condition of the welding terminal shown in FIG. 2.

FIG. 1 is a perspective view showing an overall construction of the welding terminal according to the first embodiment of the invention, FIG. 2 is a cross-sectional view of the welding terminal of FIG. 1 taken along the line A—A of FIG. 1, and FIG. 3 is a cross-sectional view showing a welded condition of the welding terminal shown in FIG. 2.

As shown in FIG. 1, the welding terminal 10 according to the first embodiment of the invention, has an integral construction, and is formed by bending an electrically-conductive sheet. The welding terminal 10 includes a terminal base plate portion 20 which has a female terminal portion 25 (serving as an electrical connection portion), formed at a front end portion thereof, and also has a pair of wire sheath-clamping portions 30 formed at a rear end portion thereof. Further, a pair of side walls 22 are formed on and project generally perpendicularly from opposite side edges of an intermediate portion of the terminal base plate portion 20, respectively, to form a welding portion 21 having a U-shaped in a cross-section.

A conductor portion 12, having a plurality of conductors 13 which are covered with an insulating sheath 15 of a wire 11, is welded to the welding portion 21 of the terminal base plate portion 20 so as to electrically connect to the welding portion 21.

When a male terminal 27 is inserted into an insertion hole 26 in the female terminal portion 25 formed at the front end portion of the terminal base plate portion 20, the male terminal 27 is electrically connected to the female terminal portion 25.

The pair of wire sheath-clamping portions 30, formed at the rear end portion of the terminal base plate portion 20, are press-fastened to the insulating sheath 15 of the wire 11.

Each of the pair of side walls 22, formed on and projecting generally perpendicularly respectively from the opposite side edges of that portion of the terminal base plate portion 20, forming the welding portion 21, has a corner portion 23 of a cross-sectionally radiused (rounded) shape with respect to the welding portion 21 as shown in FIG. 2. Preferably, a radius range of the cross-sectionally radiused (rounded) corner portion 23 is ⅓ to 1 times a radius r of the conductor portion 12.

When the radius of the cross-sectionally radiused corner portion 23 is less than the radius r of the conductor portion 12, there is a fear that it is difficult to press the plurality of conductors 13 closely into the corner portion 23 of the welding portion 21, with no gap formed therebetween.

On the other hand, When the radius R of the corner portion 23 is larger than the radius r of the conductor portion 12, there is a fear that the pair of side walls 22 fail to positively prevent the conductors 13 of the conductor portion 12, pressed by a vibration horn 35 during the welding operation, from being loosened.

Next, a method of connecting the welding terminal 10 and the wire 11 together will be described with reference to FIGS. 1 to 3.

First, the insulating sheath 15 is removed from the wire 11 to expose the conductor portion 12 as shown in FIG. 1, and the exposed conductor portion 12 is set in the welding portion 21 of the terminal base plate portion 20.

Then, the vibration horn 35 is pressed against this conductor portion 12 from the upper side, and in this condition the vibration horn 35 applies ultrasonic vibration to the conductor portion 12 as shown in FIG. 2.

As a result, the cross-section of the conductor portion 12 is deformed from a circular shape into a flattened shape, and at the same time the conductors 13 of the conductor portion 12 are fused by localized vibration heat produced by the ultrasonic vibration energy.

At this time, the side walls 22, generally perpendicularly formed respectively at the opposite side portions of the welding portion 21, serve to prevent the conductors 13 of the conductor portion 12, pressed by the vibration horn 35, from being loosened, thereby preventing the ultrasonic vibration energy from being less liable to be transmitted thereto.

And besides, each of the side walls 22 has the corner portion 23 of a cross-sectionally radiused (rounded) shape with respect to the welding portion 21. The plurality of conductors 13, pressed during the welding operation, can be expanded to the corner portions 23 of the welding portion 21 with no gap formed therebetween, and therefore can be uniformly pressed thereto as shown in FIG. 3.

Figure 7A:
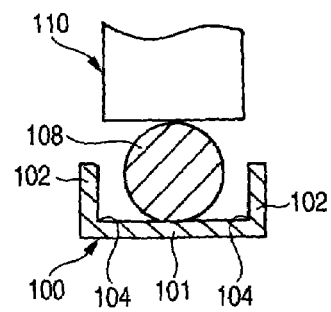
FIGS. 7A to 7C are views taken along the line B—B of FIG. 6, explaining a welded condition of the related welding terminal of FIG. 6.
Figure 7B:
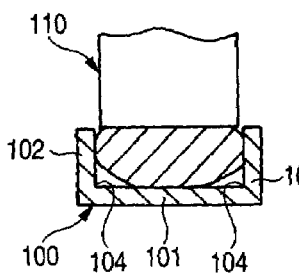
Figure 7C:
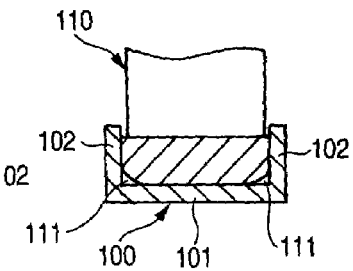

As a result, the pressing force, developing during the welding operation, is uniformly transmitted to the plurality of conductors 13, so that the steadily welding can be effected, and therefore as compared with the related welding terminal 100 of FIG. 7C, the joint area increases, and the strength of the joined portions increases.

Further, in the welding terminal 10 of this embodiment, the conductors 13 of the conductor portion 12 can be pressed into intimate contact with the corner portions 23 of the welding portion 21 with no gap formed therebetween, and therefore any gap such as the gaps 111, developing in the related welding terminal 100 as shown in FIG. 7C, will not be formed.

Therefore, the formation of an interfacial corrosive product between the welding terminal 10 and the conductor portion 12 can be suppressed, so that the electrical connection performance of the welding terminal 10 is prevented from being lowered.

The construction of the welding terminal of the invention, such as the terminal base plate portion and the side walls, is not limited to the construction of the first embodiment, but various modifications can be made within the scope of the invention.

For example, although the welding terminal 10 of this embodiment has the female terminal portion 25 (serving as the electrical connection portion) formed at the front end portion of the terminal base plate portion 20, and also has the pair of wire sheath-clamping portions 30 formed at the rear end portion thereof, the electrical connection portion can be formed as a male terminal, and the provision of the wire sheath-clamping portions can be omitted.

Figure 4:
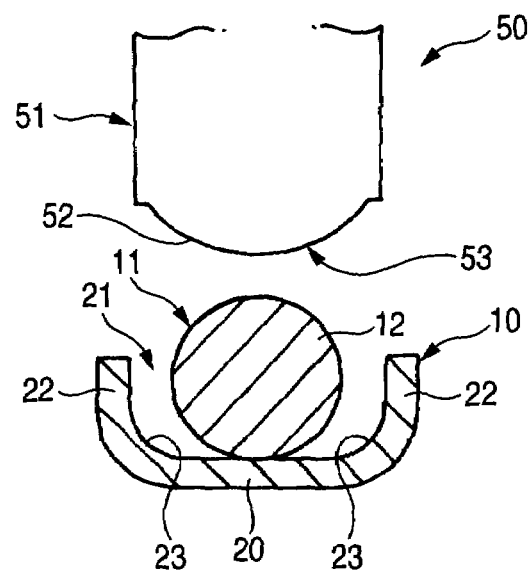
FIG. 4 is an enlarged cross-sectional view of an important portion of a welding apparatus for welding a welding terminal according to a second embodiment of the invention.
Figure 5:
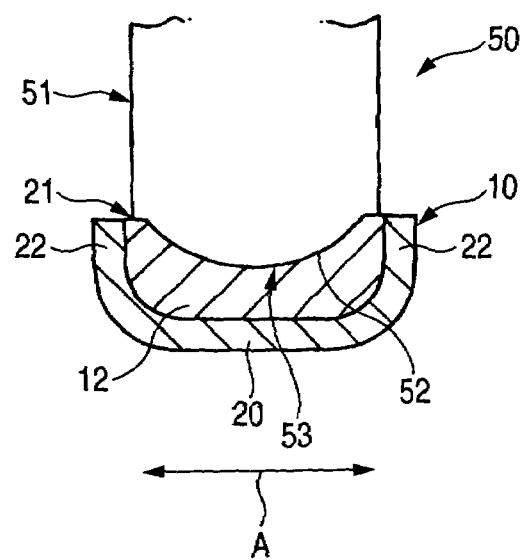
FIG. 5 is a cross-sectional view showing a welded condition achieved by the welding apparatus for welding a welding terminal of FIG. 4.
Figure 6:
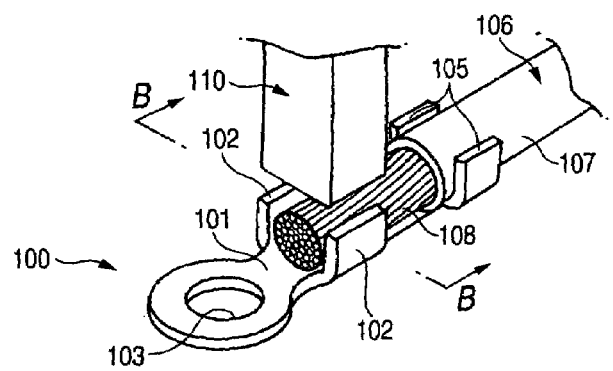
FIG. 6 is a perspective view explanatory of a related method of connecting a welding terminal and a wire together.

FIGS. 4 and 5 are enlarged cross-sectional views of an important portion of a welding apparatus for a welding terminal according to a second embodiment of the invention. Identical members to those of the first embodiment will be designated by identical reference numerals, respectively, and explanation thereof will be omitted.

As shown in FIG. 4, the welding apparatus 50 for the welding terminal according to the second embodiment is an ultrasonic welding apparatus including a vibration horn 51 serving as a joining and pressing member. The vibration horn 51 presses a conductor portion 12 of a wire 11, which has a plurality of conductors 13 covered with an insulating sheath 15, against a welding portion 21 of the welding terminal 10, having a pair of side walls 22 formed on and projecting generally perpendicularly respectively from opposite side edges of a terminal base plate portion 20, so as to weld the conductors to this welding portion.

A convex ridge 53 is formed on a distal end face for pressing 52 of the vibration horn 51, and has a curved face which is curved in a direction of a width of the terminal. In this embodiment, the convex ridge 53 has a cross-sectionally arcuate shape defined by a cylindrical curved face.

Next, a method of connecting the welding terminal 10 and the wire 11 together by the use of the welding apparatus 50 for the welding terminal according to the second embodiment will be described.

First, the insulating sheath 15 is removed from the wire 11 to expose the conductor portion 12, and the exposed conductor portion 12 is set in the welding portion 21 of the terminal base plate portion 20, as shown in FIG. 4.

Then, the vibration horn 51 is pressed against this conductor portion 12 from the upper side, and in this condition the vibration horn 51 apples ultrasonic vibration to the conductor portion 12.

As a result, the cross-section of the conductor portion 12 is deformed from a circular shape into a flattened shape, and at the same time the conductors 13 of the conductor portion 12 are fused by localized vibration heat produced by the ultrasonic vibration energy as shown in FIG. 5.

At this time, the convex ridge 53, formed on the distal end face 52 of the vibration horn 51, uniformly presses the plurality of conductors 13 to expand these conductors 13 in the direction of the width of the terminal (in arrow A direction in FIG. 5). Namely, the plurality of conductors 13 can be pressed not only toward the terminal base plate portion 20 but also toward the opposite side walls 22 so as to be compressed.

As a result, the plurality of conductors 13 thus pressed can be satisfactorily expanded to corner portions 23 of the welding portion 21 with no gap formed therebetween, and the pressing force, applied during the welding operation, can be uniformly transmitted to the plurality of conductors 13, and the welding can be effected efficiently, and besides the joint area increases, and the strength of the joined portions increases.

Furthermore, the conductors 13 of the conductor portion 12 are pressed into intimate contact with the corner portions 23 of the welding portion 21 with no gap formed therebetween, and therefore the formation of an interfacial corrosive product between the welding terminal 10 and the conductor portion 12 can be suppressed, so that the electrical connection performance of the welding terminal 10 is prevented from being lowered.

The welding apparatus 50 for the welding terminal according to the second embodiment can efficiently weld the conductions 13 of the conductor portion 12 to the welding portion 21, and therefore the vibration energy, required for ultrasonically vibrating the vibration horn 51, can be decreased for energy-saving purposes, and besides the welding time can be reduced so as to enhance the productivity.

The joining and pressing member of the welding apparatus for the welding terminal of the invention is not limited to the vibration horn 51 of the second embodiment, but various modified forms can be adopted within the scope of the invention.

For example, in the welding apparatus 50 for the welding terminal of the second embodiment, although the vibration horn 51 is used as the joining and pressing member, an electrode for electric welding can be used as the joining and pressing member instead of the vibration horn 51.

The shape of the distal end face for pressing is not limited to the cross-sectionally arcuate shape defined by a cylindrical curved face as described above for the convex ridge 53, but various shapes, having a curved surface curved in the direction of the width of the terminal, can be used.

What is claimed is:

1. A welding terminal for electrically connecting a conductor portion of a wire which has a plurality of conductors covered with an insulating sheath, comprising:
   a terminal base plate portion, on which the conductor portion is placed for welding by one of electric resistance welding and ultrasonic welding; and a pair of side walls, formed on opposite side edges of the terminal base plate portion so as to stand perpendicularly, wherein each corner portion formed by the each side wall and terminal base plate portion has a rounded shape in cross section, a radius of the corner portion being in a range of ⅓–½ times a radius of the conductor portion of the wire.

* * * * *